United States Patent [19]

Ohike

[11] Patent Number: 4,810,106

[45] Date of Patent: Mar. 7, 1989

[54] BEARING STRUCTURE

[75] Inventor: Yukio Ohike, Shizuoka, Japan

[73] Assignee: Yazaki Corporation, Japan

[21] Appl. No.: 126,487

[22] Filed: Nov. 30, 1987

[51] Int. Cl.$^4$ .......................... F16C 35/00; F16B 39/30
[52] U.S. Cl. .................................... 384/428; 384/295; 411/310
[58] Field of Search ............... 384/226, 276, 295–300, 384/428, 438, 439, 441, 908, 909; 411/309–311

[56] References Cited

U.S. PATENT DOCUMENTS

| | | | |
|---|---|---|---|
| 1,451,484 | 4/1923 | Woodward | 411/311 |
| 2,177,004 | 10/1939 | Purtell | 411/311 |
| 2,371,365 | 3/1945 | Tomalis et al. | 411/310 |
| 3,196,692 | 7/1965 | Jensen | 73/496 |
| 3,330,162 | 7/1967 | Powell | 73/496 |
| 3,422,683 | 1/1969 | Powell | 73/496 |
| 3,422,684 | 1/1969 | Powell | 73/496 |
| 3,731,725 | 5/1973 | Brophy | 411/310 |
| 4,445,794 | 5/1984 | Sandberg | 384/428 |

Primary Examiner—Thomas R. Hannon
Attorney, Agent, or Firm—Wigman & Cohen

[57] ABSTRACT

A bearing structure in particular for use in a meter having an axis of a pointer comprises a bearing support member having an internal thread and bearing member for supporting the axis rotationally, and the bearing member adapted to be fixed to the bearing support member, and the bearing member being formed of a synthetic resin and having an outer periphery. On the outer periphery of the bearing member, there are formed at least one complete thread portion having an external thread formed on the outer periphery of the bearing member, the external thread adapted to be screwed into the internal thread of the bearing support member, and at least one incomplete thread portion formed on said outer periphery, thereby the bearing being fixed to the bearing support member by screwing the incomplete thread portion into the internal thread of the bearing support member compulsorily.

19 Claims, 3 Drawing Sheets

BEARING STRUCTURE

BACKGROUND OF THE INVENTION:

1. Field of the Invention

This invention relates in general to a bearing structure, in particular to a bearing structure used for supporting an end of a lightweight axis, such as a shaft of a pointer of a tachometer or speedmeter or the like, rotated by light torque.

2. Description of the Prior Art

In a bearing which supports a lightweight axis, such as a pointer of a tachometer or speedmeter, rotated by light torque, it is not required to have mechanical strength in a structure in itself and a fixing structure of the bearing. On the other hand, however, the bearing has to have a function that can be adjusted toward the axial direction of the axis accurately so as to meet the position of the axis. Further, once the position is decided, it is required to fix the bearing such that the position of the axis is not displaced.

In a bearing structure having the bearing which can satisfy the above requirement, the structures as illustrated in FIGS. 1 and 2 were conventionally adopted.

FIG. 1 is a section view showing the position that such a bearing structure is actually used in a meter. In FIG. 1, a numeral 1 indicates a housing of the meter. On the housing 1, an upper plate 2 is provided. Said upper plate 2 has an aperture in its central portion, and a bearing structure 3 is mounted in the aperture. Said bearing structure 3 supports an axis 4 rotationally which is rotated in accordance with rotation of a drive shaft (not shown). On top of the axis 4, a pointer 5 is attached. In the drawing, a numeral 6 indicates a scale plate.

FIG. 2 is an enlarged view showing the bearing structure 3. In the drawing, the numeral 10 indicates a bearing support which consists of a metal such as brass or aluminum. The bearing support 10 comprises a cylindrical portion 10a and a flange portion 10b. On a part of an outer surface of the cylindrical portion 10a of the bearing support 10 and on an inner surface thereof, there are formed an external thread 10c and an internal thread 10d, respectively. The bearing support 10 is fixed to the upper plate 2 by inserting the cylindrical portion 10a of the bearing support 10 into an aperture of the upper plate 2 and fastening a nut 11 onto the external thread 10c of the cylindrical portion 10a.

Into the cylindrical portion 10a of the bearing support 10, a bearing 12 which also consists of a metal material is mounted. The bearing 12 also comprises a cylindrical portion 12a and flange portion 12b. On the outer surface of the cylindrical portion 12a, an external thread 12c which is threaded with the internal thread 10d of the bearing support 10 is formed.

In order to adjust the position of the bearing 12 with respect to the position of an axis 4 finely, the bearing 12 is turned clockwise or counterclockwise. After the adjustment is completed, the bearing 12 is fixed to the bearing support 10 with an adhesive 13. As a result, the bearing 12 is fixed to the bearing support 10 secured to the upper plate 2 and can maintain the adjusted position without displacing therefrom.

FIG. 3 illustrates the other conventional bering structure. This structure comprises a bearing support 20 and a bearing 21 both consisting of a metal such as brass or aluminum. The bearing support 20 has a cylindrical portion 20a and flange portion 20b. In an inner surface of the cylindrical portion 20a, there is formed an internal thread 20c. A bearing 21 which supports an axis 4 rotationally and around which an external thread 21a is formed is screwed into the internal thread 20c of the bearing support 20. The cylindrical portion 20a of the bearing support 20 is inserted into an aperture provided in the upper plate 2 and a nut 22 is screwed onto the external thread 21a of the bearing 21. In the conventional structure, in the same manner as that of the conventional structure in FIG. 2, after the position of the bearing 21 is finely adjusted, the bearing 21 is fixed of the position by fastening force between the nut 22 and the bearing support 20.

As appeared from the conventional structures, the bearings 12 and 21 have the following two functions. One of the functions is a beaaring function which supports the axis rotationally, and the other is an adjusting function which finely adjusts the position of the axis with respect to the bearing 12 or 21 and fix the position of the bearing. In both conventional structures, the fine adjustment of the bearing is performed by screwing the bearing 12 or 21. On the other hand, the positioning of the bearing 12 or 21 is performed by the adhesion with the adhesive in the structure in FIG. 1, while in the structure in FIG. 2 a double nut fastening is used as the positioning.

However, the conventional bearing structures have the following disadvantages, respectively. Specifically, in the former structure that the adhesive is used, according to the amount of the adhesive applied thereon, a dispersion of fixing strength is apt to be caused. As a result, if the amount of the adhesive is little the fixing force is deteriorated and further if the application of the adhesive is forgotten the fixing position of the bearing may be displaced.

In addition, if an oleo-resin or a flourine-containing resin is used for materials of the bearing, there is a case that the adhesive can not be used, to that the materials used for manufacturing of the bearing is limited.

Further, in the bearing structure that the double nuts fastening is used or the structure that the adhesive is used, as shown in FIGS. 2 and 3, screwing operations have to be done between the bearing support 10 or 20 and bearing 12 or 21, and between the bearing support 10 or 20 and nut 11 or 22. Therefore, there is a problem that assembly thereof was very troublesome due to the necessity of the screwing operations. Furthermore, it is difficult to reduce the number of the parts more than this.

However, in order to reduce the manufacturing cost of the product, it is necessary to reduce the number of the parts as much as possible and shorten the time required for the assembly of the parts.

SUMMARY OF THE INVENTION

In view of the foregoing problems, this invention has been made. An object of this invention is to provide a bearing structure having a bearing which does not need to employ an adhesive when the bearing is fixed. Another object of the present invention is to provide a bearing structure which can reduce the number of the parts of the structure and can shorten the time required for assembly thereof, whereby it is possible to make assembly thereof easy.

Yet another object of the present invention is to provide a bearing structure which can reduce its weight.

Still another object of the present invention is to provide a bearing structure which has a self-locking function.

In order to attain the above objects, a bearing structure according to the present invention comprises a bearing support member having an internal thread, a bearing for supporting an axis rotationally, the bearing adapted to be fixed to the bearing support member, and the bearing being formed of a synthetic resin and having an outer periphery, at least one complete thread portion having an external thread formed on the outer periphery of the bearing, the external thread adapted to be screwed into the internal thread of the bearing support member, and at least one incomplete thread portion formed on the outer periphery, thereby the bearing being fixed to the the bearing support by screwing the incomplete thread portion into the internal thread of the bearing support member compulsorily.

In accordance with the the bearing structure described above, the following results are obtained. Specifically, the number of the parts can be reduced since a fastening nut or an adhesive which were required in the conventional bearing structures becomes unnecessary. In addition, since an application of the adhesive becomes unnecessary, it can be avoided that an accident caused from an adhesive failure is happened. Further, since the bearing structure is fixed only when the bearing is adjusted with respect to the axis, an assembly of the bearing structure becomes easy, so that the number of the parts required for the bearing is reduced. Furthermore, since the bearing structure is also formed of a synthetic resin, a weight of it is reduced in comparison with the conventional bearing formed of a metal. Moreover, the bearing structure is functioned as an oilless bearing, it becomes unncesary to apply lubricant there.

These and the other objects and advantages of the present invention, as well as the details of an illustrative embodiment, will be more fully understood from the following specification and drawings.

BRIEF DESCRIPTION OF THE PREFERRED EMBODIMENT

Figures 6A, 6B, 6C:
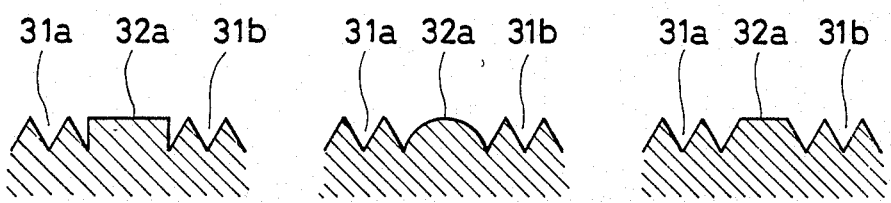
FIGS. 6A, 6B and 6C are section views each showing a modification of a shape of an incomplete thread portion provided on the bearing.
Figure 7:
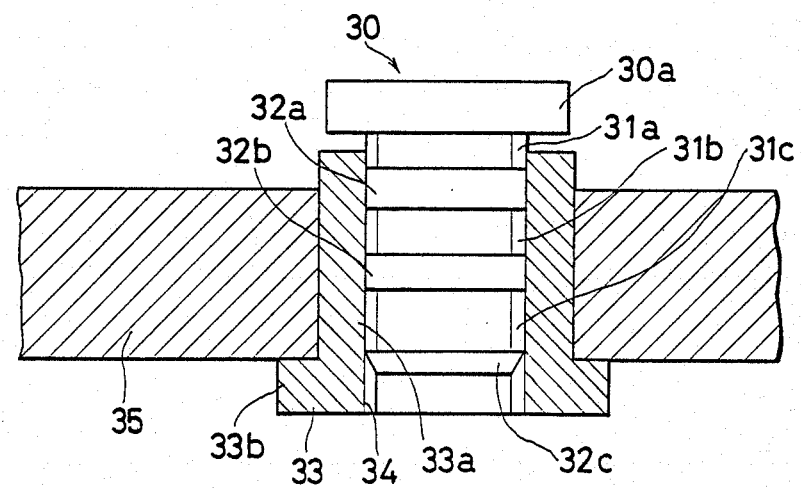
FIG. 7 is a section view showing the condition that the bearing structure is actually used.
Figure 8:
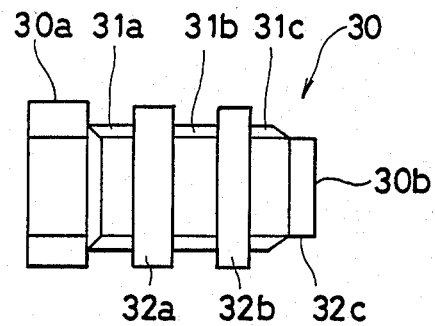
FIG. 8 is a view similar to FIG. 4 showing an embodiment of the invention in which the diameter of the incomplete thread portion is slightly larger than the diameter of the complete thread portion of the bearing.
Figure 9:
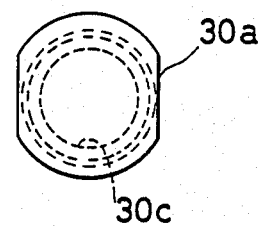
FIG. 9 is a view similar to FIG. 5 of the bearing of FIG. 8.
Figure 10A:
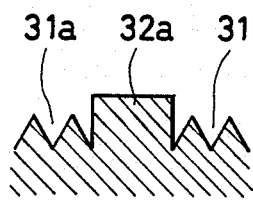
Figure 10B:
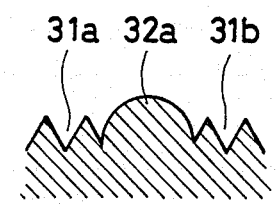
Figure 10C:
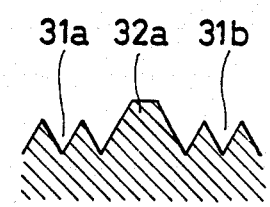

FIGS. 10A, 10B, and 10C are views similar to FIGS. 6A, 6B, and 6C of the bearing of FIG. 8.

DETAILED DESCRIPTION OF THE PREFERRED EMBODIMENT

Referring now to the drawings, the embodiments of the present invention are described in detail.

Figure 1:
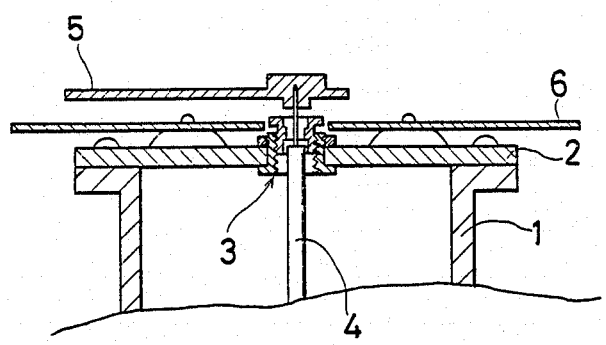
FIG. 1 is a section view showing a part of a meter which includes a conventional bearing sructure.
Figure 2:
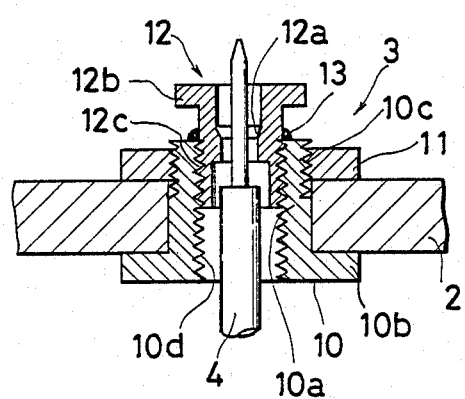
FIG. 2 is a section view showing the conventional bearing structure.
Figure 3:
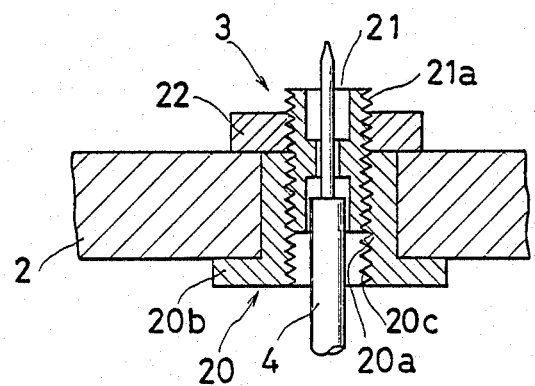
FIG. 3 is a section view showing the other conventional bearing structure.
Figure 4:
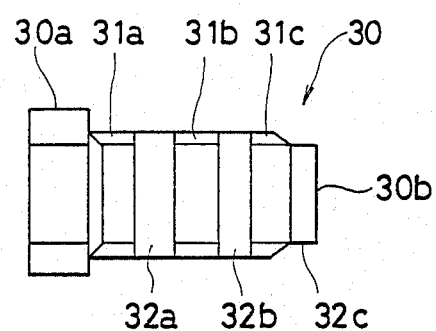
FIG. 4 is a left side view of a bearing of the embodiment of the present invention.
Figure 5:
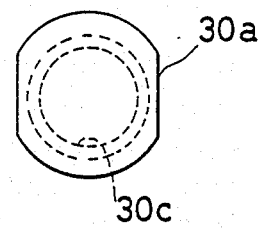
FIG. 5 is a front view of the bearing in FIG. 4.

In FIG. 4, a bearing structure 30 comprises a screw head portion 30a and an axial portion 30b. Through the screw head portion 30a and the axial portion 30b, an aperture 30c into which an axis is rotationally inserted is formed. As shown in FIG. 5, opposite sides of the screw head portion 30a are cut off so as to be engaged with a fastening tool such as a spanner or the like. Of course, the screw head portion 30a may have a hexagon shape. On the outer surface of the axial portion 30b, three complete thread portions 31a, 31b and 31c are formed so as to have a space therebetween, respectively. Between the complete thread portions 31a and 31b, an incomplete thread portion 32a is formed, and between the complete thread portions 31b and 31c, an incomplete thread portion 32b is formed. Further, as shown in the drawing, an additional incomplete thread portion 32c may be formed at the top of the axial portion 30b.

Said complete thread portions 31a, 31b and 31c are formed as external threads which have an effective diameter to an internal thread portion of a bearing support, respectively. On the other hand, each of the incomplete thread portions 32a and 32b has substantially the same diameter as the diameter of each of the complete thread portion 31a, 31b and 31c. It is preferable that the diameter of each incomplete thread portion 32a and 32b has the same diameter of that of the complete thread portion 31a, 31b or 31c, in FIGS. 4-6(C), or have the diameter larger than the diameter of the complete thread portion to the extent 0.05 mm illustrated in FIGS. 8-10(C). The incomplete thread portions 31a, 31b and 31c may have a rectangular shape, semi-circular shape or trapezoid shape in cross section, which are illustrated in FIGS. 6(A), 6(B) or 6(C), respectively.

It is preferred that the bearing is formed of a synthetic resin which does not require a lubricant, such as polyacetal resin having lubricity e.g. oleo-resin or fluorine-containing resin. As a result, in comparison with the conventional metallic bearing structure, there are advantages that a cost for manufacturing it is reduced and a maintenance thereof becomes easy due to unnecessary of lubricant, and that not only weight thereof but also material cost are reduced.

It is preferable that the diameter of the incomplete thread portion 32c is slightly smaller than the minor diameter of the complete thread portion 31a, 31b or 31c in order to make the screwing insertion into the internal thread easy.

In this case, it is not necessary to provide the incomplete thread portion 32c at the top of the axial portion 30b. Instead of the incomplete thread portion 32c, it is possible to provide a complete thread portion at the top of the axial portion 30b.

Thus formed bearing 30 is mounted to the bearing support member 33 which is fixed to an aperture of an upper plate 35 by means of calking or the like. The bearing support member 33 comprises a cylindrical portion 33a, and a flange portion 33b. On an inner surface of the cylindrical portion 33a, the internal thread 34 into which the bearing member 30 is screwed is formed. As a result, the incomplete thread portions 32a, 32b and 32c is deformed by elasticity compression with threaded cutting. However, in a case where the diameter of the incomplete thread portion 32a, 32b or 32c is substantially equal to the diameter of the complete thread portion 31a, 31b or 31c, only elasticity compressive deformation is caused on the incomplete thread portions.

When the screwing of the bearing 30 is stopped at the position where adjustment of the bearing 30 with respect to the axis (not shown) is completed, the bearing 30 is securely fixed at the position with a large compressive frictional resistance force.

The fixing force between the bearing 30 and the bearing support member 33 is about 400 to 800 gcm, so that it is sufficient for supporting the bearing when the axis which has a light weight is rotated by a light torque which is under 0.5 gcm. Further, the position of the bearing fixed to the bearing support member is not affected by external temperature changes, vibration and mechanical shock and the like.

In the above embodiment, although the bearing described above has three incomplete thread portions, it is sufficient for performing the function to provide more than one incomplete thread portion on the axial portion thereof.

Further, in the above embodiment, although the bearing support member is formed from an independent part, it is possible to form the bearing support member integrally with the upper plate.

It must be understood that the invention is in no way limited to the embodiments and that many change may be brought therein without departing from the scope of the invention as defined by the appended claims.

What is claimed is:

1. A bearing structure, comprising:
   bearing support means having an internal thread;
   bearing means for supporting an axis rotationally, said bearing means adapted to be mounted to said bearing support means, and said bearing means being formed of a synthetic resin and having an outer periphery;
   a plurality of external thread portions formed on said outer periphery of the bearing means, said external thread portions adapted to be screwed into said internal thread of said bearing support means; and
   a plurality of incomplete thread portions formed on said outer periphery alternately between the external thread portions;
   whereby the bearing means is fixed to said bearing support means by applying an axial-directed force while screwing said bearing means into said internal thread of said bearing support means, such that the plurality of incomplete thread portions allows the bearing means to be adjusted and locked in an arbitrary position to enable smooth rotation of said axis.

2. A bearing structure as set forth in claim 1, wherein said synthetic resin is oleo-resin.

3. A bearing structure as set forth in claim 1, wherein said synthetic resin is fluorine-containing resin.

4. A bearing structure as set forth in claim 1, wherein said plurality of external thread portions comprises three external thread portions and said plurality of incomplete thread portions comprises two incomplete thread portions.

5. A bearing structure as set forth in claim 4, wherein a third incomplete thread portion having a diameter smaller than that of the external thread portions is formed at a loading end of the bearing means.

6. A synthetic resin bearing member for supporting an axis rotationally while mounted in a bearing support having an internal thread, the bearing member having an outer periphery, comprising:
   a plurality of external thread portions formed on the outer periphery of the bearing member, the external thread portions adapted to be screwed into the internal thread of the bearing support; and
   a plurality of incomplete thread portions formed on the outer periphery alternately between the external thread portions;
   whereby the bearing means is fixed to the bearing support by applying an axial-directed force while screwing the bearing member into the internal thread of the bearing support, such that the plurality of incomplete thread portions allows the bearing member to be adjusted and locked in an arbitrary position to enable smooth rotation of the axis.

7. A bearing member as set forth in claim 6, wherein the synthetic resin is oleo-resin.

8. A bearing member as set forth in claim 6, wherein the synthetic resin is fluorine-containing resin.

9. A bearing member as set forth in claim 6, wherein the plurality of external thread portions comprises three external thread portions and the plurality of incomplete thead portions comprises two incomplete thread portions.

10. A bearing member as set forth in claim 9, wherein a third incomplete thread portion having a diameter smaller than that of the external thread portions is formed at a leading end of the bearing means.

11. A bearing member as set forth in claim 6, wherein the incomplete thread portions have a rectangular shape in cross section.

12. A bearing member as set forth in claim 6, wherein the incomplete thread portions have a semi-circular shape in cross section.

13. A bearing member as set forth in claim 6, wherein the incomplete thread portions have a trapezoidal shape in cross section.

14. A synthetic resin bearing member for supporting an axis rotationally while mounted in a bearing support having an internal thread, the bearing member having an outer periphery, comprising:
   at least one external thread portion formed on the outer periphery of the bearing member, the external thread portion adapted to be screwed into the internal thread of the bearing support; and
   at least one incomplete thread portion formed on the outer periphery, the diameter of the incomplete thread portions being the same as, or slightly larger than, the diameter of the external thread portion;
   whereby the bearing means is fixed to the bearing support by applying an axial-directed force while screwing the bearing member into the internal thread of the bearing support.

15. A bearing member as set forth in claim 14, wherein the synthetic resin is oleo-resin.

16. A bearing member as set forth in claim 14, wherein the synthetic resin is fluorine-containing resin.

17. A bearing member as set forth in claim 14, wherein the at least one external thread portion comprises three external thread portions and the at least one incomplete thread portion comprises two incomplete thread portions.

18. A bearing member as set forth in claim 17, wherein a third incomplete thread portion having a diameter smaller than that of the external thread portions is formed at a leading end of the bearing means.

19. A bearing member as set forth in claim 17, wherein the difference in diameters between the incomplete thread portions and the complete thread portions lies in the range of values between zero and 0.05 mm.

* * * * *